(12) United States Patent
Pendleton et al.

(10) Patent No.: US 11,808,251 B2
(45) Date of Patent: Nov. 7, 2023

(54) PUMPED HYDROELECTRIC SYSTEM AND METHOD USING A GRAVITY-FED PUMP

(71) Applicant: GARTECH, LLC, Houston, TX (US)

(72) Inventors: Gary Pendleton, Shotley Bridge (GB); Gary Warren Stratulate, Houston, TX (US)

(73) Assignee: GARTECH, LLC, Houston, TX (US)

( * ) Notice: Subject to any disclaimer, the term of this patent is extended or adjusted under 35 U.S.C. 154(b) by 0 days.

(21) Appl. No.: 17/568,200

(22) Filed: Jan. 4, 2022

(65) Prior Publication Data

US 2022/0216768 A1 Jul. 7, 2022

Related U.S. Application Data

(60) Provisional application No. 63/133,887, filed on Jan. 5, 2021.

(51) Int. Cl.
| | |
|---|---|
| *F03D 9/13* | (2016.01) |
| *F03D 9/28* | (2016.01) |
| *F03D 9/00* | (2016.01) |
| *F03D 9/11* | (2016.01) |

(52) U.S. Cl.
CPC ............... *F03D 9/28* (2016.05); *F03D 9/007* (2013.01); *F03D 9/008* (2013.01); *F03D 9/11* (2016.05); *F05B 2220/703* (2020.08)

(58) Field of Classification Search
CPC . F03D 9/007; F03D 9/008; F03D 9/11; F03D 9/25; F03D 9/28; F05B 2220/703; F05B 2220/706; F05B 2220/708; H02K 7/183
USPC ........................................................ 290/43, 54
See application file for complete search history.

(56) References Cited

U.S. PATENT DOCUMENTS

| | | | | |
|---|---|---|---|---|
| 1,247,520 A | * | 11/1917 | Fessenden | F03D 9/28 60/413 |
| 4,174,926 A | * | 11/1979 | Hamrick | F03D 9/17 417/334 |
| 4,206,608 A | * | 6/1980 | Bell | F03D 9/17 290/55 |
| 6,051,892 A | * | 4/2000 | Toal, Sr. | F03B 17/005 290/43 |
| 8,008,796 B2 | * | 8/2011 | Muchow | E03B 11/12 290/43 |
| 2010/0259044 A1 | * | 10/2010 | Muchow | E03B 11/12 137/565.17 |
| 2012/0019004 A1 | * | 1/2012 | Ekern | E02B 9/08 290/53 |

* cited by examiner

*Primary Examiner* — Tulsidas C Patel
*Assistant Examiner* — S. Mikailoff
(74) *Attorney, Agent, or Firm* — Ewing & Jones, PLLC

(57) ABSTRACT

Embodiments presented provide for a high efficiency electrical production system that utilizes a pump and windmill system to produce electrical energy through hydro power and wind action.

8 Claims, 2 Drawing Sheets

PUMPED HYDROELECTRIC SYSTEM AND METHOD USING A GRAVITY-FED PUMP

CROSS-REFERENCE TO RELATED APPLICATIONS

The current application claims priority to U.S. Provisional Patent Application Ser. No. 63/133,887, dated Jan. 5, 2021, the entirety of which is incorporated by reference.

FIELD OF THE DISCLOSURE

Aspects of the disclosure relate to efficient production of energy. More specifically, aspects of the disclosure relate to a pump centered electrical production system incorporating water from a water resource and wind energy.

BACKGROUND

Hydro-electric generation is currently used to supplement high electric demand, when it is required, as opposed to wind and solar electric creation, which is dependent upon the environmental conditions for their use.

Hydro-electric generation, given a suitable water source, can be switch on and off at will. Hydro-electric generation does require a large storage of water at a high elevation (potential energy), which can be converted to kinetic energy by releasing the water from the storage facility (reservoir), through a piping system leading to the water turbine. The elevation causing the water to accelerate due to gravity, resulting in a velocity of the water.

For commercial purposes (generating high kW output), electric water turbine generators require a large amount of water reaching high velocity, created by the fall in elevation, (kinetic energy) impacting on the turbine creating rotary motion of the turbine, allowing the generation of electricity.

Once the water is exhausted from the turbine, the water is generally returned to the water course (river/stream/drainage channels) where it dissipates.

When there is a high electric demand, the hydro-electric system can be switched on, producing the electricity required. The water is depleted from the reservoir which limits the overall time period a hydro-electric system can be used, and if the water source is depleted sufficiently, will be unable to run until the water source is restored.

Water can be restored by the natural sources of rivers/streams/rain feeding into the reservoir, or can be restored by pumping water back to the reservoir from a low-level source, i.e., river/stream used from the turbine outlet, using cheap overnight electric, generated from other sources as the electric demand is less, restoring the water to the reservoir.

There is a need to provide a system that will allow for production of energy as well as recharging of necessary water facilities.

There is a further need to provide a system that produces electricity at a competitive price and rate.

There is a still further need to provide a system that does not need excessive maintenance and that is robust.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of electrical production is disclosed. The method may comprise obtaining a fluid from a fluid source. The method may also comprise providing the fluid from the fluid source to a pump system. The method may also provide for rotating a wind energy system, the wind energy system connected to the pump system such that rotation of the wind energy system rotates the pump system. The method may also provide for increasing a pressure of the fluid within the pump system from the pump system connected to the wind energy system. The method may also entail providing the increased pressure fluid from the pump system to a water turbine. The method may also provide for rotating the water turbine with the fluid from the pump system to produce an exhaust fluid. The method may also provide for producing electricity from a generator connected to the water turbine.

In another example embodiment, an electrical production system is disclosed. The electrical production system comprises a pump system configured to accept a fluid and exhaust the fluid at a pressure higher than a pressure the fluid was delivered to the pump system. The electrical production system further comprises a wind turbine connected to the pump system and configured to provide the pump system a motive force. The electrical production system further comprises a water turbine connected to the pump system. The electrical production system further comprises a generator connected to the water turbine, wherein motion of the water turbine is configured to spin the generator and produce electricity. The electrical production system further comprises a water feed system connected to the pump system, the water feed system configured to deliver a fluid from a fluid source to the pump system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
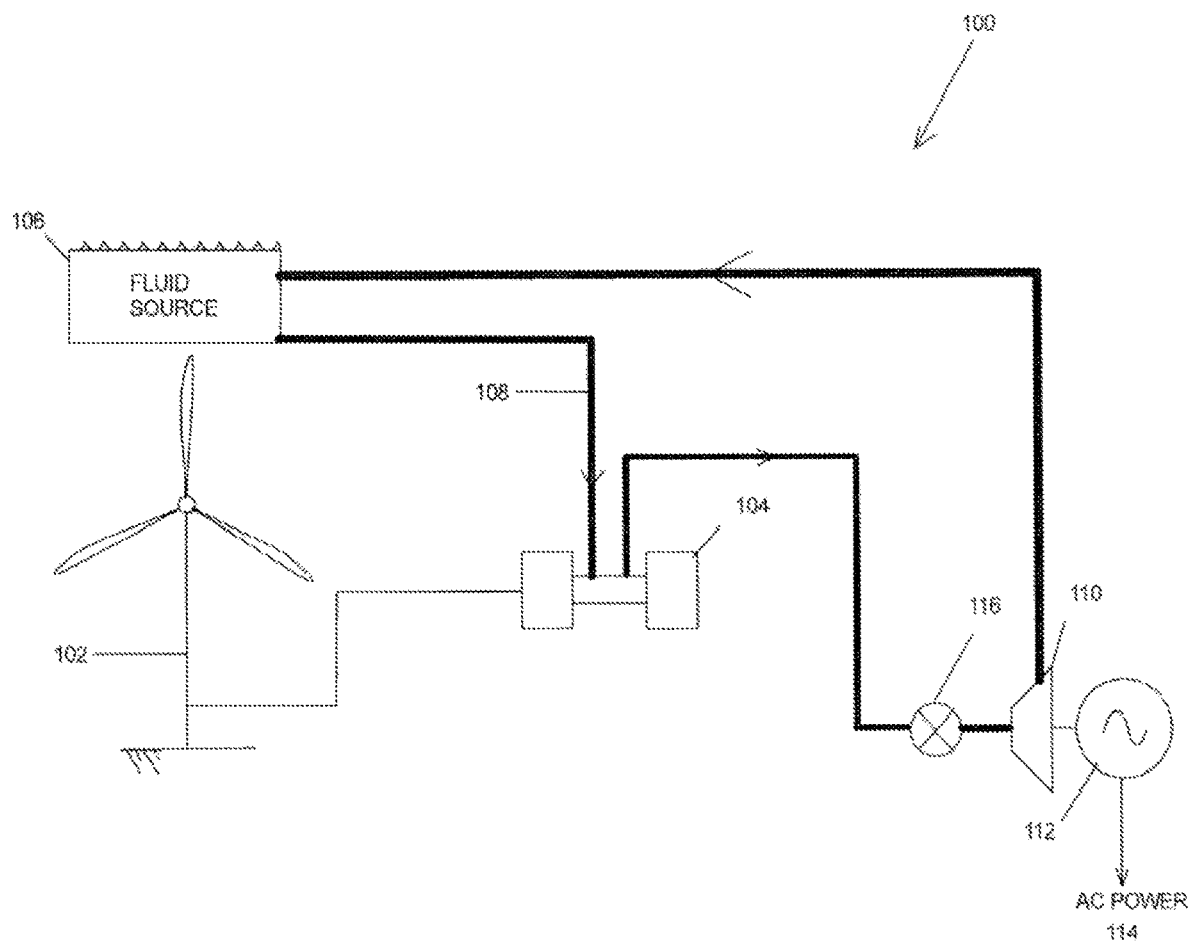
FIG. 1 is an example electrical production system according to one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In one non-limiting embodiment, an electrical production system 100 is illustrated. The purpose of the electrical production system 100 is to produce electricity for user consumption in a highly efficient manner. Aspects of the electrical production system 100 are based upon a pump system that provides motive force for fluid traveling within the electrical production system 100. In one embodiment, a low speed/high torque input from a wind turbine 102 is provided to a pump system 104. The low speed/high torque input from the wind turbine 102 is used to drive the pump system 104 to pump a working fluid, such as fresh water.

In one non-limiting embodiment, the fresh water is provided from a body of water 106 through a gravity feed 108. The gravity feed 108 may be a pipe. Example embodiments may be a 10 inch (25.4 cm) diameter pipe. Various sizes may be used for the pipe. In embodiments, water is delivered at a high volume and low pressure. Through use of the pump system 104 and the wind turbine 102, the water is delivered at a high flow and high-pressure output (at the exit of the pump system 104) that is then fed to a water turbine 110. A generator 112 is connected to the water turbine 110 to produce an electrical current at a defined voltage. As will be understood, the electricity produced may have different characteristics depending upon the needs of the electrical system 114 that is connected to the generator 112. The wind turbine 102 is configured to rotate at low speeds, but deliver sufficient torque to the pump system 104 to allow the pump system 104 to send the working fluid to the water turbine 110. In the illustrated embodiment, a water valve 116 is provided to provide cut-off capability between the pump system 104 and the water turbine 110. In embodiments, the generator 112 is configured as to generate alternating current voltage.

The water turbine 110 may have a speed control system to prevent the water turbine 110 from spinning over a predefined limit. Such speed control may allow for a water bypass, if necessary, effectively "deloading" the water turbine 110 from loads that may damage the water turbine 110.

An example embodiment is provided for description of the efficiency of the system. As illustrated in FIG. 1, a large quantity of water may be fed by gravity through the pipe 108 to the pump system 104. A wind turbine 102 is configured to rotate at 10 revolutions per minute with the output of the turbine powering the pump system 104. In this embodiment, the amount of water supplied to the pump system 104 is 118 liters per second. The pump system 104 is configured to accept the input from the wind turbine 102 and produce an output of 118 liters per second at a pressure of 3515348 $kg/m^2$. Supplying the 118 liters per second at a pressure of 3,515,348 $kg/m^2$ to the water turbine rated at 75 percent efficiency would result in greater than 3000 kW.

In embodiments, water exiting the water turbine 110 may again be supplied to the body of water 106, thus replenishing the body of water 106 through a piping system. The wind turbine 102 may be located in different areas according to available geography. In one embodiment, the wind turbine 102 may be located near the fluid source 106.

Figure 2:
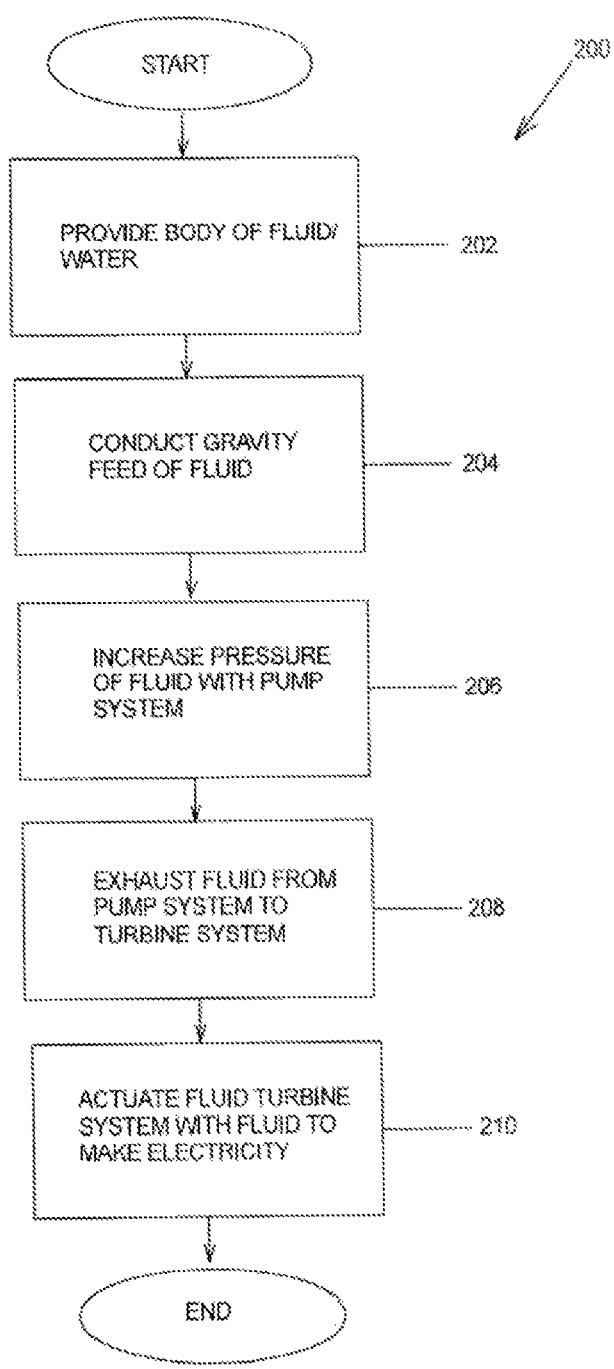
FIG. 2 is a method of operating the electrical production system according to one example embodiment of the disclosure.

Referring to FIG. 2, a method 200 for production of electrical energy is illustrated. The method may include, at 202, providing a body of working fluid for use with the electrical energy system. At 204, the method proceeds with conducting a gravity feed of the working fluid to a pump system. At 206, the method continues with pumping the working fluid to a higher pressure than a feed pressure of the working fluid from the body of the working fluid. At 208, the method continues with exhausting the higher-pressure working fluid to a fluid turbine system. At 210, the method continues with actuating the fluid turbine system to generate electrical energy from a generator attached to the fluid turbine system.

In embodiments, multiple systems described above may be placed together in a series relationship, wherein an output of the water turbine 110 drains to a following pump system 104 of a following electrical production system.

In embodiments, control systems may be put in place to aid in control of the entire system. To this end, control systems may "start" or "stop" the systems according to various parameters. For example, it may be determined by a central dispatcher that electrical need is low for a power grid for the next eight (8) hours. To this end, the central dispatcher may issue a "stop" production order that will limit inflow to the pump system or that may disconnect a circuit breaker to the generator. At a time when electrical need is greater, the central dispatcher may issue a "start" order, thereby allowing either connection of the generator to the electrical grid system or to allow connection of the fluid source to the pump system. As will be understood, other variations may be provided such that a battery energy storage system is connected to the pump system. As rotation of the wind turbine 102 cannot directly be controlled, as the wind may be variable, rotation times for the wind turbine 102 may be valuable for use at a later time. Examples of such times may be during heating and cooling in the early morning and late afternoon hours where winds may be stronger. There may be instances where electrical demand is not economical at these times, and, as such, placement of a battery energy storage system to store energy from the wind turbine 102 may be advantageous if demand increases at a later time that the wind is not blowing.

In still other embodiments, other technologies may be used to supplement the electricity production system and methods described in relation to FIG. 1 and FIG. 2. For example, solar technology may be used to supplement energy provided by the wind turbine, if needed. Amounts of supplementation may vary according to the needs of system. As will be understood, greater or lesser amounts of solar arrays may be made to make greater or lesser amounts of electricity.

In still further embodiments, solar arrays may be made to actuate a separate pump system that returns the water exiting the water turbine back to the water supply system, creating a closed loop. Such closed loop systems have several advantages, including environmental conservation.

As will be understood from the description, utilizing a wind turbine to turn a high-volume capacity pump, water from a reservoir at a drastically reduced elevation, can be fed to the pump. As the pump turns, the pump creates flow and pressure, the results being, an increase in velocity of the water as it's released to the turbine. The increase in pressure created by the pump, negating the need of elevation of a conventional hydro-water supply. Water is then fed through high pressure piping before being expelled at the water turbine, running the turbine in a conventional manner.

As the pump is increasing the pressure and maintains flow volume, over the water column required for conventional operation, is drastically reduced, bring several additional possibilities of operation.

In embodiments, the water storage facility can be at differing elevations. In one embodiment, the water storage facility may be at a lower elevation compared to another embodiment.

In embodiments, multiple wind turbine/pump/generators can be installed over a current single use hydro-electric installation, i.e. the exhaust water from the $1^{st}$ installation, being fed to a second installation, repeating a number of times, subject to the overall elevation available, resulting in better utilization of the water, i.e. the installations are 'daisy chained' to fully utilize the water available.

A final pumping station then being used to constantly return the water to the water storage facility (24/7). As the majority of the system is wind operated the system has the potential to run for extended operating periods and produce higher levels of electric output, when compared to a single use (current) installation.

In embodiments, the system described can be used with a current hydro-electric installation, with the wind turbine/pump continually pumping water back to the reservoir, negating the need to have additional electric pumps for normal operation (since wind for a large proportion of time is blowing). Only emergency electric pumps being needed should the environmental conditions not be appropriate.

Hydro-electric provides an energy storage system, which can be accessed when required. Conventional wind turbine generators generally producing the electricity supply with little to no storage, so can only be accessed when the wind is blowing. The system described above could still be used as a conventional hydro-electric power system, but with the addition of the wind turbine/pump units, additional power can be extracted from the water flow. With the addition of return water pumping station at the base it also mean the hydro-system can be used for extended periods of operation as the water source is being continually replenished.

The process described better utilizes the water supply, producing a higher output electric supply and extending operational windows of conventional hydro-electric stations.

In one example embodiment, a method of electrical production is disclosed. The method may comprise obtaining a fluid from a fluid source. The method may also comprise providing the fluid from the fluid source to a pump system. The method may also provide for rotating a wind energy system, the wind energy system connected to the pump system such that rotation of the wind energy system rotates the pump system. The method may also provide for increasing a pressure of the fluid within the pump system from the pump system connected to the wind energy system. The method may also entail providing the increased pressure fluid from the pump system to a water turbine. The method may also provide for rotating the water turbine with the fluid from the pump system to produce an exhaust fluid. The method may also provide for producing electricity from a generator connected to the water turbine.

In another example embodiment, the method may further comprise returning the exhaust fluid to the fluid source.

In another example embodiment, the method may be performed wherein the fluid source is a lake.

In another example embodiment, the method may be performed wherein the increasing the pressure of the fluid within the pump system is assisted through a battery energy storage system.

In another example embodiment, the method may be performed wherein the increasing the pressure of the fluid within the pump system is assisted through a photovoltaic system.

In another example embodiment, the method may be performed wherein the providing the fluid from the fluid source is through a gravity assisted pipe.

In another example embodiment, the method may further comprise providing the exhaust fluid from an additional electricity production system.

In another example embodiment, an electrical production system is disclosed. The electrical production system comprises a pump system configured to accept a fluid and exhaust the fluid at a pressure higher than a pressure the fluid was delivered to the pump system. The electrical production system further comprises a wind turbine connected to the pump system and configured to provide the pump system a motive force. The electrical production system further comprises a water turbine connected to the pump system. The electrical production system further comprises a generator connected to the water turbine, wherein motion of the water turbine is configured to spin the generator and produce electricity. The electrical production system further comprises a water feed system connected to the pump system, the water feed system configured to deliver a fluid from a fluid source to the pump system.

In another example embodiment, the electrical production system may further comprise a valve connected to the water turbine, the valve configured to shut off a water supply to the water turbine.

In another example embodiment, the electrical production system may further comprise an energy storage system connected to the wind turbine and configured to store energy produced by the wind turbine the energy storage system configured to supplement pumping by the pumping system.

In another example embodiment, the electrical production system may further comprise at least one photovoltaic array configured to produce electrical energy, the at least one photovoltaic array connected to the energy storage system.

In another example embodiment, the electrical production system may be configured wherein the water feed system is a gravity fed pipe.

In another example embodiment, the electrical production system may be configured wherein the generator is configured to produce alternating current.

In another example embodiment, the electrical production system may further comprise a piping system connected to the fluid source and the water turbine, the piping system configured to transport fluid from the water turbine to the fluid source.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of electrical energy production, the method comprising:
   obtaining a fluid from a fluid source;
   providing the fluid from the fluid source directly to a pump system using gravity;
   rotating a wind energy system, the wind energy system connected to the pump system such that rotation of the wind energy system rotates the pump system;
   increasing a pressure of the fluid with the pump system;
   providing the increased pressure fluid from the pump system to a water turbine;
   rotating the water turbine with the fluid from the pump system to produce an exhaust fluid; and
   producing electricity from a generator connected to the water turbine.

2. The method according to claim 1, further comprising:
   returning the exhaust fluid to the fluid source.

3. The method according to claim 1, wherein the fluid source is a lake.

4. The method according to claim 1, wherein a sloped pipe provides the fluid from the fluid source to the pump system.

5. An electrical energy production system, the electrical energy production system comprising:
   a pump system configured to accept, from a fluid source, a fluid at a first pressure, the pump system exhausting the fluid at a second pressure higher than the first pressure;
   a wind turbine connected to the pump system and configured to provide the pump system a motive force;
   a water turbine connected to the pump system;
   a generator connected to the water turbine, wherein motion of the water turbine is configured to spin the generator and produce electricity; and
   a water feed system directly connected to the pump system, the water feed system configured to deliver the fluid from the fluid source to the pump system using gravity.

6. The electrical energy production system according to claim 5, wherein the water feed system is a pipe.

7. The electrical energy production system according to claim 5, wherein the generator is configured to produce alternating current.

8. The electrical energy production system according to claim 5, further comprising:
   a piping system connected to the fluid source and to the water turbine, the piping system configured to transport fluid from the water turbine to the fluid source.

* * * * *